United States Patent

Banks

[15] 3,696,163
[45] Oct. 3, 1972

[54] ISOBUTENE AND/OR ISOAMYLENES FROM CAT POLY GASOLINE

[72] Inventor: Robert L. Banks, Bartlesville, Okla.
[73] Assignee: Philips Petroleum Company
[22] Filed: June 1, 1970
[21] Appl. No.: 42,095

[52] U.S. Cl. ..........................260/683 D, 260/683.2
[51] Int. Cl. ...............................................C07c 3/62
[58] Field of Search.......................260/683 D, 683.2

[56] References Cited

UNITED STATES PATENTS

| | | |
|---|---|---|
| 3,565,969 | 2/1971 | Hutto et al.................260/683 |
| 3,457,320 | 7/1969 | Stapp et al.................260/683 |
| 2,900,429 | 8/1959 | Heinemann et al.....260/683.2 |
| 3,590,094 | 6/1971 | Reusser et al. ............260/683 |
| 3,217,057 | 11/1965 | Moore et al. ...........260/683.2 |

*Primary Examiner*—Delbert E. Gantz
*Assistant Examiner*—C. E. Spresser
*Attorney*—Young and Quigg

[57] ABSTRACT

The conversion of cat poly gasoline to isobutene using an olefin disproportionation reaction is increased by subjecting a heavy olefin fraction separated from the olefin disproportionation effluent to skeletal isomerization prior to recycle of said fraction to the olefin disproportionation reactor. In a preferred embodiment, isoamylenes are advantageously prepared using a second olefin disproportionation step which employs the isobutene-containing stream as the feedstock.

7 Claims, 2 Drawing Figures

INVENTOR.
R. L. BANKS

ISOBUTENE AND/OR ISOAMYLENES FROM CAT POLY GASOLINE

BACKGROUND OF THE INVENTION

1. Field of the Invention

This invention relates to the preparation of isobutene and/or isoamylenes. In a further aspect, the invention relates to olefin disproportionation.

2. Description of the Prior Art

The reaction of olefinic materials to produce other olefinic materials wherein the reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, and wherein the two new double bonds can be on the same or different molecules, has been called "the olefin reaction." The breaking and formation of these bonds can be visualized by using a mechanistic scheme involving a cyclobutane intermediate. Thus, two unsaturated pairs of carbon atoms combine to form a four-center (cyclobutane) intermediate which then dissociates by breaking either set of opposing bonds. This reaction can be illustrated by the following formulas:

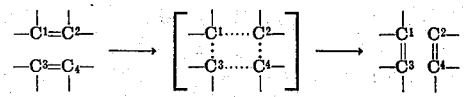

Other terms have been utilized to describe the reactions of olefinic materials which are within the scope of the olefin reaction as defined above. These include such terms as "olefin disproportionation," "olefin dismutation," "transalkylidenation," and "olefin metathesis." Throughout this specification and claims, the term "olefin disproportionation" is used as a matter of choice, and is deemed to be equivalent to the above-mentioned terms, including "the olefin reaction" terminology. Numerous catalyst systems have been reported which effect this reaction, including the catalysts of U.S. Pat. No. 3,261,879, Banks (1966), and U.S. Pat. No. 3,365,513, Heckelsberg (1968).

Included among the reactions which fall within the scope of the term "olefin disproportionation," there is a reaction which employs ethylene as one of the reactants. That is, ethylene can be one of the unsaturated pairs of carbon atoms which combines to form the four-center (cyclobutane) intermediate with another unsaturated pair of carbon atoms on a different and larger olefinic molecule. For example, ethylene and pentene-2 in the presence of an olefin disproportionation catalyst react to form butene-1 and propylene. Because of the fact that the larger molecule (pentene-2) has been broken to form the shorter molecules (butene-1 and propylene), this specific type of olefin disproportionation reaction has been called "ethylene cleavage." Another term which has been applied to this type of olefin reaction is "etheneolysis".

Isobutene and/or isoamylenes are valuable intermediates in the preparation of rubbery polymers, e.g., polyisobutene and polyisoprene. Accordingly, the industry desires efficient methods of producing these materials using available feedstocks. One available feedstock is a mixture of predominantly branched olefins having at least six carbon atoms per molecule. This feedstock has been called "cat poly gasoline." Suitable methods are available for its direct preparation. For example, butenes and propylene can be co-oligomerized in the presence of a suitable oligomerization catalyst to provide such a feedstock. The cat poly gasoline can be cleaved with ethylene in an olefin disproportionation reaction to yield substantial amounts of isobutene.

OBJECTS OF THE INVENTION

It is an object of this invention to prepare isobutene. It is a further object of this invention to prepare isoamylenes. Other objects and advantages of the invention will be apparent from a careful reading of the following disclosure and the appended claims.

SUMMARY OF THE INVENTION

We have discovered a method whereby isobutene can be prepared from cat poly gasoline by subjecting the cat poly gasoline feedstock to cleavage in the presence of an olefin disproportionation catalyst. In our process, the cleaving olefin may be ethylene and/or propylene. The effluent from the cleavage reaction is subjected to a separation step in order to provide a stream of $C_4$ olefins containing a substantial amount of isobutene and a stream comprising olefin hydrocarbons heavier than isobutene which is recycled to the cleavage step. Unexpectedly, we have found that the conversion of the cat poly gasoline to isobutene can be increased if the heavier olefin fraction from the separation zone is recycled to the cleavage reactor after passage through an olefin skeletal isomerization zone.

Further in accordance with the invention, we have discovered that isoamylenes can be prepared in high conversions by subjecting the $C_4$ olefin stream containing isobutene and butene-2 to a second olefin disproportionation step. The olefin disproportionation reaction of these mixed butenes is accomplished in the absence of a cleaving olefin and produces isoamylenes. The effluent from the second disproportionation step is then passed to a separation zone wherein isoamylenes are recovered as product, and a stream comprising olefinic hydrocarbons heavier than isoamylenes is recycled to the cleavage unit of the first step.

DETAILED DESCRIPTION OF THE INVENTION

The significant advantage of the invention is that the ultimate conversion of the cat poly gasoline to the desired product (isobutene and/or isoamylenes) is substantially increased by contacting the heavier olefin fraction from the separation zone with the skeletal isomerization catalyst. Although it is not completely understood why the conversion is thus increased, it is believed that when olefin feedstreams containing a broad variety of olefin materials are subjected to ethylene cleavage, complete conversion is retarded due to the presence of certain highly branched structures within the olefinic materials. These highly branched olefinic materials are believed to be resistant to the ethylene cleavage reaction. The passage of these resistant branched olefinic materials through the skeletal isomerization unit renders the branched materials more susceptible to ethylene cleavage, thus increasing the conversion to isobutene and/or isoamylene.

Figure 1:
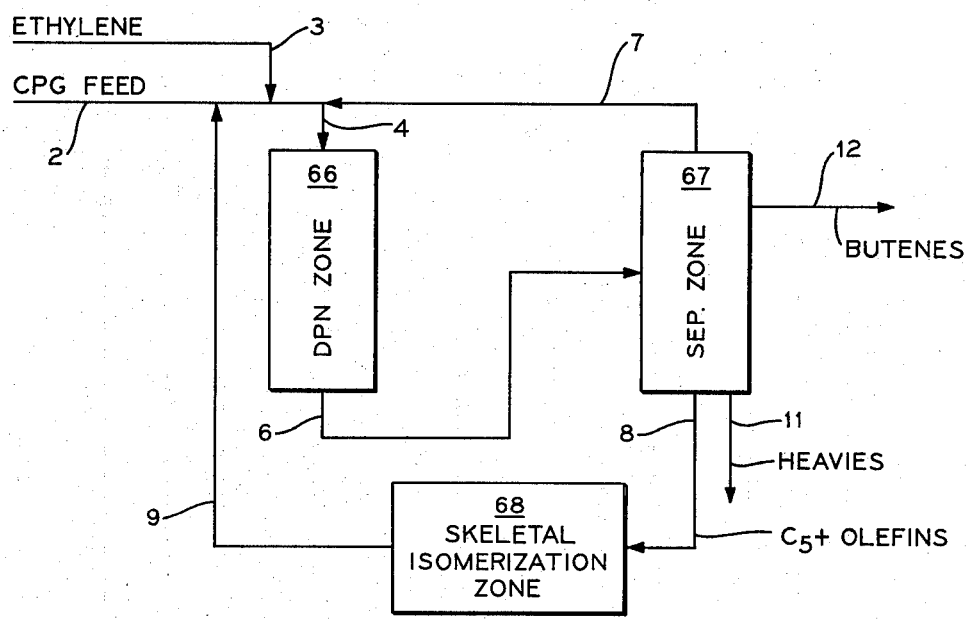
FIG. 1 of the drawing is a schematic flow diagram of the process of the invention illustrating the preparation of isobutene from cat poly gasoline.

The invention can best be understood by reference to the drawings. In FIG. 1, cat poly gasoline in line 2 is blended with suitable quantities of ethylene and/or propylene from line 3, and introduced via line 4 into olefin disproportionation zone (DPN) 66. The ethylene cleavage reaction within zone 66 provides an effluent comprising ethylene, propylene, n-butenes, isobutenes, and some amylenes as well as incompletely converted feed materials. This effluent from zone 66 is conducted via line 6 to a separation zone 67 wherein ethylene and/or propylene is separated and recycled via line 7 to the ethylene cleavage zone 66. The isobutene and n-butene olefin fraction are separated and recovered via line 12. Undesirable heavy materials can be removed through line 11.

The $C_5+$ olefin fraction from zone 67 comprising unconverted cat poly gasoline in line 8 is passed through an olefin skeletal isomerization unit 68 under reaction conditions sufficient to substantially rearrange the branching of at least some of the olefins. The skeletal isomerization effluent stream is then passed to the ethylene cleavage reactor 66 by way of line 9 where it is blended with fresh cat poly gasoline and subjected to further cleavage to desired products.

Figure 2:
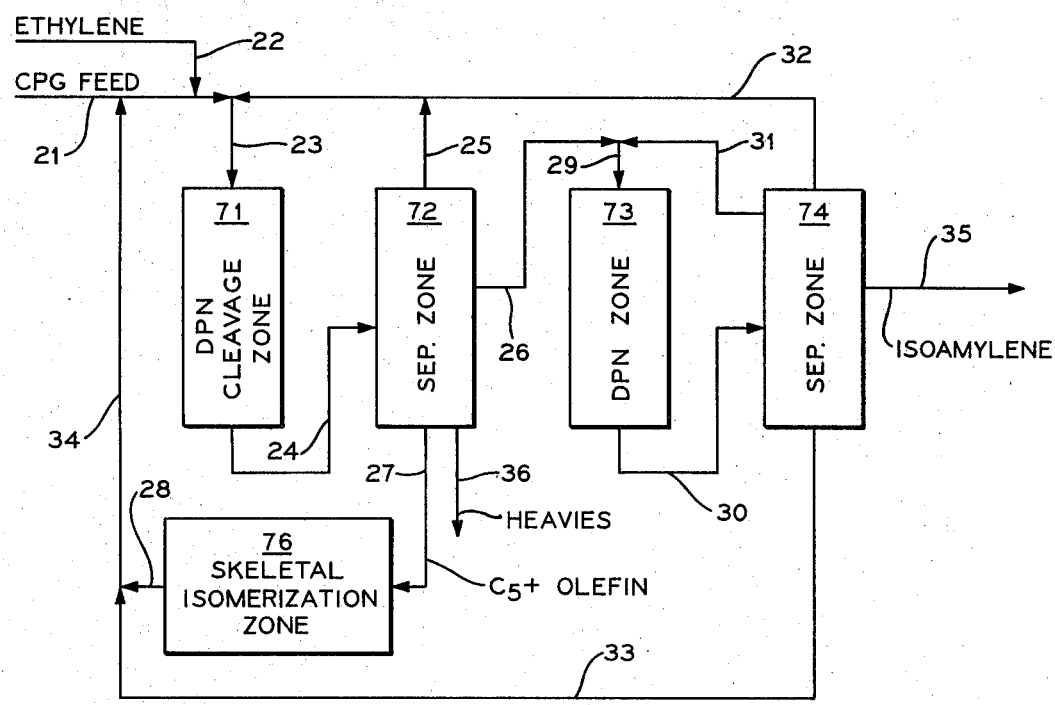
FIG. 2 of the drawing is a schematic flow diagram of the process of the invention illustrating the preparation of isoamylenes from cat poly gasoline.

FIG. 2 of the drawing illustrates a process wherein isoamylenes are prepared utilizing the skeletal isomerization treatment described above and an additional olefin disproportionation unit to convert isobutene and butene-2 to isoamylenes. Cat poly gasoline in line 21 is combined with ethylene from line 22 in line 23 and subjected to ethylene cleavage within zone 71. The effluent from zone 71 in line 24 is passed to separation zone 72 wherein ethylene and propylene are removed and recycled via line 25 to the ethylene cleavage unit 71. The $C_5+$ olefin fraction in line 27 comprising unconverted cat poly gasoline is subjected to skeletal isomerization in zone 76. The treated $C_5+$ olefin fraction is removed from zone 76 in line 28 and conducted via line 34 to the ethylene cleavage unit 71. Any undesirable heavy materials which are formed within unit 71 are removed from separation zone 72 via line 36.

A stream comprising a substantial amount of isobutenes, n-butenes, and optionally some propylene, is conducted via lines 26 and 29 to olefin disproportionation unit 73. Therein, the olefin disproportionation reaction of isobutene with butene-2 produces isoamylene. Additionally, the reaction of isobutene with propylene can produce additional quantities of isoamylenes. The effluent from the reactor 73 is conducted via line 30 into separation zone 74 wherein propylene and butenes are separated and recycled via lines 29 and 31 to zone 73. Ethylene is separated and recycled to the ethylene cleavage unit 71 via line 32. A $C_6+$ olefin fraction is separated within zone 74 and returned via lines 33 and 34 to ethylene cleavage unit 71. If desired, the $C_6+$ olefin in line 33 can be passed through skeletal isomerization zone 76. Isoamylenes are recovered from separation zone 74 via line 35.

The olefin disproportionation catalysts suitable for use in the process of the present invention are any of the catalysts which have ability for converting propylene to ethylene and butene. These catalysts are sometimes referred to in the art as "olefin reaction" catalysts. These catalysts are now well known in the art. The method of preparation and the use of these disproportionation catalysts is also known in the art. Solid olefin disproportionation catalysts are presently preferred. Some examples of the preferred catalysts systems are molybdenum oxide on alumina or aluminum phosphate, tungsten oxide on silica or alumina, and rhenium oxide on alumina or aluminum phosphate. Included in those disproportionation catalysts which are operable in the process of the invention are the homogeneous-type catalysts which can be deposited upon suitable support materials. Among those are bis(triphenylphosphine)-dinitrosyldichloromolybdenum admixed with methylaluminum sesquichloride. This catalyst can be deposited on a suitable calcined support (such as silica gel or the like).

When performing the ethylene cleavage operation, it is presently preferred to utilize an olefin disproportionation catalyst in combination with a double bond isomerization catalyst. For example, a catalyst bed containing a mixture of a silica-supported tungsten oxide disproportionation catalyst and a magnesium oxide double bond isomerization catalyst is an excellent mixed catalyst system. Other suitable combination catalysts are disclosed in copending applications Ser. No. 627,635, Banks, filed Apr. 3, 1967, now abandoned, and Ser. No. 678,499, filed Oct. 27, 1967, now abandoned. Other catalysts which are suitable for the ethylene cleavage reaction are disclosed in U.S. application Ser. No. 516,673, Crain, filed Dec. 27, 1965.

Because of the wide variety of catalysts which are available for use in the disproportionation steps of the invention, the temperature, pressures, flow rates, ratios of catalyst to feed materials, and other operating conditions will vary over a wide range. The molecular weight of the olefin feed material, the optimum temperature, pressure, and contact times for the particular catalyst system employed, the distribution of disproportionation products desired, will all effect the operating conditions to be used in the reaction zones and subsequent separation operations. Therefore, the particular conditions employed can be easily selected by one skilled in the art. Generally, the cat poly gasoline, before contact with the disproportionation catalyst, is blended with the ethylene and/or propylene in proportions which can range from about 1 to about 20, preferably 4 to about 10 mols of ethylene and/or propylene per mol of feed olefin.

The olefin skeletal isomerization step can utilize any suitable catalyst which is effective for skeletally isomerizing olefins. Such catalytic processes require relatively severe operating temperatures such as temperatures in the range of from about 600° to about 1,200° F. Some examples of suitable olefin skeletal isomerization catalysts are silica-alumina; eta-alumina; tungsten oxide on eta-alumina; molybdena-boria-alumina; aluminum fluoride; aluminum fluoride promoted with the oxides or sulfides of tungsten, platinum, or chromium; chromium sulfate; HF-treated alumina; boron phosphate on alumina; dehydrated bauxite; acid-treated clay; and the like, and mixtures thereof. Particularly good results are obtained using the aluminum fluoride catalysts at an operating temperature of about 600° F.

Depending on the specific disproportionation and skeletal isomerization catalysts chosen to carry out the steps of the invention, any suitable reaction technique can be utilized, such as fixed bed reaction, fluidized bed reaction, liquid phase batch and continuous operations, and the like. Conventional methods can be used to separate the materials present in the reaction effluent, including fractionation, crystallization, adsorption, and the like. Fractionation is generally preferred. Saturated materials which accumulate in the system can easily be removed by suitable techniques well known in the art.

The operation of the invention can best be understood by reference to the following examples, which are designed to illustrate the process of the invention. It is emphasized that the data recited within the examples are for the purpose of illustrating the process of the invention and should not be construed as unduly limiting the scope of the invention as claimed. In the absence of actual plant runs, the data of the examples have been calculated to illustrate the process of the invention.

ILLUSTRATIVE EXAMPLE I

Isobutene is prepared from a cat poly gasoline feed by a process as depicted in FIG. 1 of the drawing. The ethylene cleavage unit 66 employs 40 weight parts tungsten oxide on silica admixed with 160 weight parts magnesium oxide as the mixed catalyst system. The catalyst is prepared and utilized in accordance with the procedure described by Crain, Ser. No. 516,673, filed Dec. 27, 1965. The conditions of operation in the ethylene cleavage unit 66 include a temperature of 700° F. and a pressure of 400 psig. The skeletal isomerization zone 68 employs 50 weight parts aluminum fluoride as the catalyst and is operated at a temperature of 600° F. and 15 psig. Fractionators are operated at suitable temperatures and pressures to effect the separations mentioned above when discussing FIG. 1 of the drawing. A material balance of the various streams is set forth in Table I.

TABLE I

Stream (weight parts per hour)

|  | 2 | 3 | 4 | 6 | 7 | 8 | 9 | 11 | 12 |
|---|---|---|---|---|---|---|---|---|---|
| Ethylene |  | 410 | 1320 | 910 | 910 |  |  |  |  |
| Propylene |  |  | 1050 | 1050 | 1050 |  |  |  |  |
| Isobutene |  |  |  | 1090 |  |  |  |  | 1090 |
| n-Butene |  |  |  | 270 |  |  |  |  | 270 |
| Isopentene | 80 |  | 358 | 230 |  | 230 | 278 |  |  |
| n-Pentenes | 10 |  | 62 | 100 |  | 100 | 52 |  |  |
| C$_6$+ | 910 |  | 1565 | 705 |  | 705 | 655 | 50 |  |
| Total | 1000 | 410 | 4355 | 4355 | 1960 | 1035 | 985 | 50 | 1360 |

The above example illustrates the preparation of isobutene utilizing the ethylene cleavage type of olefin disproportionation reaction in combination with skeletal isomerization of the recycle C$_5$+ olefin fraction to increase the yield of isobutenes. Under the same conditions but in the absence of such a skeletal isomerization step, the conversion level of the cleavage step falls off rapidly and the quantity of the recycle fraction builds up to levels which are difficult to manage.

ILLUSTRATIVE EXAMPLE II

Isoamylenes are prepared from a cat poly gasoline feed by a process as depicted in FIG. 2 of the drawing. Disproportionation reactor 71 contains a mixture of 45 weight parts WO$_3$/SiO$_2$ and 180 weight parts MgO and is operated under conditions similar to that of reactor 66 in FIG. 1. The skeletal isomerization reactor 76 contains 50 weight parts AlF$_3$ catalyst and is operated in a similar manner to zone 68 as discussed above in the illustrative example I. The olefin disproportionation reactor 73 utilizes 45 weight parts of a WO$_3$/SiO$_2$ catalyst and operates at 750° F. and 400 psig.

A material balance of the various streams is set forth in Table II.

TABLE II

Stream (weight parts per hour)

| Olefin | 21 | 22 | 23 | 24 | 25 | 26 | 27 | 28 | 29 | 30 | 31 | 22 | 33 | 34 | 35 | 36 |
|---|---|---|---|---|---|---|---|---|---|---|---|---|---|---|---|---|
| C$_2$ |  | 460 | 2,475 | 1,600 | 1,600 |  |  |  |  | 415 |  | 415 |  |  |  |  |
| C$_3$ |  |  | 700 | 1,115 | 700 | 415 |  |  | 1,210 | 795 | 795 |  |  |  |  |  |
| iC$_4$ |  |  |  | 1,180 |  | 1,180 |  |  | 2,510 | 1,330 | 1,330 |  |  |  |  |  |
| nC$_4$ |  |  |  | 370 |  | 370 |  |  | 550 | 180 | 180 |  |  |  |  |  |
| iC$_5$ | 80 |  | 358 | 230 |  |  | 230 | 278 |  | 1,365 |  |  |  | 278 | 1,365 |  |
| nC$_5$ | 10 |  | 62 | 100 |  |  | 100 | 52 |  | 45 |  |  |  | 52 | 45 |  |
| C$_6$+ | 910 |  | 1,755 | 755 |  |  | 705 | 705 |  | 140 |  |  | 140 | 845 |  | 50 |
| Total | 1,000 | 460 | 5,350 | 5,350 | 2,300 | 1,965 | 1,035 | 1,035 | 4,270 | 4,270 | 2,305 | 415 | 140 | 1,175 | 1,410 | 50 |

The above example graphically illustrates the process of the invention of converting cat poly gasoline to isoamylenes using the ethylene cleavage type of olefin disproportionation reaction in combination with skeletal isomerization of the C$_5$+ effluent prior to recycle to the ethylene cleavage unit and further in combination with the olefin disproportionation of the isobutenes to produce isoamylenes. Under the same conditions but in the absence of the skeletal isomerization step, the production rate of isoamylenes is substantially lower.

Reasonable variations and modifications of my invention is possible without departing from the spirit and scope thereof.

I claim:

1. In a process for the preparation of isobutene wherein cat poly gasoline is subjected to olefin disproportionation in a first reaction zone in the presence of ethylene and/or propylene to provide a stream comprising isobutene and a stream comprising olefinic hydrocarbons heavier than isobutene, and wherein the stream comprising the heavier olefinic hydrocarbons is returned to the first reaction zone, the improvement comprising increasing the conversion of cat poly gasoline to isobutene by contacting the stream comprising the heavier olefinic hydrocarbons with a skeletal isomerization catalyst under skeletal isomerization conditions prior to the return of the stream to the first reaction zone.

2. A process according to claim 1 wherein the stream comprising isobutene also contains butene-2, said stream comprising isobutene and butene-2 being subjected to a second olefin disproportionation step in a second reaction zone to produce a stream comprising isoamylenes and a stream comprising olefin hydrocarbons heavier than isoamylenes.

3. A process according to claim 1 wherein the ethylene and propylene produced in the first olefin disproportionation zone are separated and recycled to that zone.

4. A process according to claim 2 wherein the propylene, isobutenes and butenes produced in the second olefin disproportionation zone are returned to the second olefin disproportionation zone.

5. A process according to claim 4 wherein the ethylene produced in the second olefin disproportionation zone is recycled to the first olefin disproportionation zone, and the stream comprising olefin hydrocarbons heavier than isoamylenes is returned to the first olefin disproportionation zone.

6. The process according to claim 4 wherein the stream comprising olefin hydrocarbons heavier than isoamylenes is combined with the stream comprising olefin hydrocarbons heavier than isobutene prior to the latter stream being contacted with the skeletal isomerization catalyst.

7. A process for the preparation of isoamylenes comprising subjecting cat poly gasoline to conversion in the presence of an olefin disproportionation catalyst and ethylene and/or propylene in a first reaction zone to provide a stream comprising isobutene and butene-2 and a stream comprising olefinic hydrocarbons heavier than isobutene, subjecting the stream comprising isobutene and butene-2 to conversion in a second olefin disproportionation zone in the presence of an olefin disproportionation catalyst to produce a stream comprising isoamylenes and a stream comprising olefin hydrocarbons heavier than isoamylenes, and passing the stream comprising olefinic hydrocarbons heavier than isobutene into contact with a skeletal isomerization catalyst under skeletal isomerization conditions prior to the return of the stream to the first reaction zone thereby increasing the conversion of cat poly gasoline to isobutene.

* * * * *